United States Patent
Kotecki

(10) Patent No.: US 8,168,922 B2
(45) Date of Patent: May 1, 2012

(54) SELF-SHIELDED FLUX CORED ELECTRODE

(75) Inventor: Damian J. Kotecki, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1948 days.

(21) Appl. No.: 10/967,391

(22) Filed: Oct. 18, 2004

(65) Prior Publication Data

US 2006/0081579 A1 Apr. 20, 2006

(51) Int. Cl.
*B23K 35/22* (2006.01)

(52) U.S. Cl. ............ 219/146.1; 219/146.23; 219/146.52

(58) Field of Classification Search ............... 219/146.1, 219/146.23, 146.52, 146.32
See application file for complete search history.

(56) References Cited

U.S. PATENT DOCUMENTS

| | | | |
|---|---|---|---|
| 2,432,773 A | 12/1947 | Lee et al. | |
| 3,266,878 A | 8/1966 | DeLong et al. | |
| 3,585,352 A | 6/1971 | Zvanut | |
| 3,670,135 A | 6/1972 | Zvanut | |
| 3,848,109 A | 11/1974 | Zvanut | |
| 4,005,309 A | 1/1977 | Zvanut et al. | |
| 4,294,614 A * | 10/1981 | Kotecki | 420/46 |
| 4,449,031 A * | 5/1984 | Kotecki | 219/145.23 |
| 4,510,374 A | 4/1985 | Kobayashi et al. | |
| 4,719,330 A | 1/1988 | Ferree | |
| 5,120,931 A * | 6/1992 | Kotecki et al. | 219/146.22 |
| 5,378,871 A | 1/1995 | Nishikawa et al. | |
| 6,339,209 B1 * | 1/2002 | Kotecki | 219/146.23 |
| 2002/0003135 A1 | 1/2002 | Goto et al. | |
| 2002/0014478 A1 | 2/2002 | Kim | |
| 2004/0173592 A1 | 9/2004 | Duncan et al. | |

FOREIGN PATENT DOCUMENTS

| | | |
|---|---|---|
| CA | 1 175 916 | 10/1984 |
| EP | 0576929 | 1/1994 |
| EP | 0652071 | 5/1995 |
| EP | 1046454 | 10/2000 |
| JP | 56-109192 | 8/1981 |
| JP | 61-238495 | 10/1986 |

OTHER PUBLICATIONS

Lincoln Electric Material Safety Data Sheet—Feb. 1, 2002, XP 002351687.

* cited by examiner

*Primary Examiner* — M. Alexandra Elve

(74) *Attorney, Agent, or Firm* — Hahn Loeser & Parks, LLP; Keith J. Marcinowski

(57) ABSTRACT

A cored electrode to form a high manganese metal deposition that includes at least about 4 weight percent manganese and at least about 10 weight percent chromium which is useful in joining dissimilar metals and/or for depositing buffer layers on carbon steel and/or low alloy steels.

65 Claims, No Drawings

SELF-SHIELDED FLUX CORED ELECTRODE

The invention relates generally to the field of welding and more particularly directed to electrodes useful in joining dissimilar metals and/or for depositing buffer layers on carbon steel and/or low alloy steels.

BACKGROUND OF THE INVENTION

In the field of arc welding, the three (3) main types of arc welding are submerged arc welding (SAW), shielded metal arc welding (SMAW), and flux-cored arc welding (FCAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the workpiece directly below it becomes molten, and molten filler metal is deposited from the electrode onto the work. The molten filler metal displaces the flux pool and forms the weld. In shielded metal arc welding, shielding is produced by a flux coating instead of a loose granular blanket of flux. In flux-cored electrodes, the flux is contained within the metal sheath.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances with which these impurities may combine, in preference to the metal to form slag. Other materials may be added to lower the slag melting point, to improve slag fluidity, and to serve as binders for the flux particles.

Coated electrodes and cored electrodes are commonly used in electric arc welding of steel base metals. These electrodes generally yield high strength welds in a single pass and multiple passes at high welding speeds. These electrodes are formulated to provide a solid, substantially nonporous weld bead with tensile strength, ductility and impact strength to meet the desired end use of various applications. The electrodes are also formulated to minimize the qualities of slag generated during a welding procedure. The slag after the welding procedure is removed to provide a clean surface that, if desired, can be later treated (e.g., painted, coated) to enhance appearance, inhibit corrosion, etc.

Cored electrodes are used increasingly as an alternative to solid weld wires for improved productivity in structural fabrication. Cored electrodes have a metal sheath and a core containing a composition of various materials. Cored electrodes typically provide increased weld deposition rates and produce wider and more consistent penetration profiles than many solid wires. Cored electrodes also typically generate less fumes and spatter, provide improved arc stability and produce weld deposits with improved wetting characteristics in comparison to many solid wires.

One type of welding operation that has presented many challenges is the welding of dissimilar metals. Due to the different compositions of the metals, the weld formed between these two metals is exposed to great stresses commonly resulting in the formation of cracks. These stresses are due in part to the different physical properties of the metals (e.g.; coefficient of thermal expansion, thermal conductivity, hardenability, yield strength, elongation, etc.). Another type of welding operation that presents challenges is the hardfacing of carbon steel and low alloy steel with chromium carbide. Cracks commonly form in such hardfacing operations due to hydrogen diffusing into the high carbon steel during the hardfacing operation and also due to cracks forming in the chromium carbide that propagate into the high carbon steel In view of the present state of the art of welding dissimilar metals and hardfacing carbon steel and low alloy steel, there is a need for a welding electrode that can be used to reduce the incidence of cracking in such welding and hardfacing procedures.

SUMMARY OF THE INVENTION

The present invention pertains to welding electrodes, and more particularly, to a welding electrode that can be used to form a weld bead between dissimilar metals and to reduce the incidence of cracking of such weld bead. The present invention also or alternatively pertains to the deposition of buffer layers on steel to reduce incidences of cracking of such steel during and/or after the hardfacing of such steel.

The electrode of the present invention is particularly directed to cored electrodes having a metal sheath that surrounds the fill composition in the core of the sheath and will be described with particular reference thereto; however, it can be appreciated that other types of electrodes could be used. The cored electrode of the present invention has a fill composition which includes a slag system and metal alloy system that deposits a crack resistant high manganese composition that is particularly useful in welding together dissimilar metals and for depositing buffer layers on carbon steels and low alloy steels. The weld formed by the electrode of the present invention can be used to form tough, hard, and impact-proof surfacings that are especially useful in connecting and/or repairing metal rail. The electrode of the present invention can also be used to form buffer layers on surfacings on difficult to weld carbon steel containing materials and manganese steels. The electrode of the present invention can also be used to weld together manganese steels. The electrode of the present invention can further be used for welding heat resistant and stainless steels and casted steels with working temperatures up to 300° C. The weld metal formed by the electrode of the present invention has a hardness of about 150-300 HB (Brinell Hardness Scale) and cold-set by mechanical strain of about 275-400 HB (Brinell Hardness Scale).

In one aspect of the present invention, the electrode of the present invention can be a self shielding electrode. As such, little or no shielding gas is required when using the electrode. It can be appreciated that a shielding gas can be used. If such a shielding gas is used, the shielding gas is used in conjunction with the electrode to provide protection to the weld bead or buffer layers from elements and/or compounds in the atmosphere. The shielding gas generally includes one or more gases. These one or more gases are generally inert or substantially inert with respect to the composition of the weld bead or buffer layer. The shielding gas can include, but is not limited to $CO_2$ shielding gas, or $CO_2$ and argon blend shielding gas, wherein $CO_2$ constitutes about 2-40% of the blend. In one non-limiting embodiment of the invention, when a blended shielding gas is used, the shielding gas includes 5-25 percent by volume carbon dioxide and the balance argon. As can be appreciated, other and/or additional inert or substantially inert gasses can be used.

In another and/or alternative aspect of the present invention, the cored electrode includes a metal sheath that is formed primarily from iron (e.g., carbon steel, low carbon steel, stainless steel, low alloy steel, etc.); however, the metal sheath can include other metals such as, but not limited to aluminum, antimony, bismuth, boron, carbon, chromium, cobalt, copper, lead, manganese, molybdenum, nickel, niobium, silicon, sulfur, tin, titanium, tungsten, vanadium, zinc and/or zirconium. In one non-limiting embodiment of the invention, the metal sheath primarily includes iron and one or more other elements such as, but not limited to, carbon, chromium, copper, manganese, molybdenum, nickel and/or silicon. In another non-limiting embodiment of the invention, the iron content of the metal sheath is at least about 80 weight percent. In still another non-limiting embodiment of the invention, the sheath of the cored electrode includes low carbon steel. In yet another non-limiting embodiment of the invention, the sheath of the cored electrode includes a stainless steel sheath (e.g., 304, 304L, 314, etc.). When the fill composition is included in the cored electrode, the fill composition typically constitutes at least about 1 weight percent of the total electrode weight, and not more than about 55 weight percent of the total electrode weight, and typically about 10-50 weight percent of the total electrode weight, and more typically about 20-48 weight percent of the total electrode weight, and even more typically about 25-45 weight percent of the total electrode weight. In one non-limiting embodiment of the invention, the fill composition of the cored electrode has a higher weight percent when the sheath is formed of a low carbon steel. In one particular non-limiting example, the fill composition of the cored electrode in a low carbon mild steel sheath is about 30-50 weight percent of the total electrode, typically about 35-48 weight percent of the total electrode, and more typically about 40-46 weight percent of the total electrode. In another particular non-limiting example, the fill composition of the cored electrode in a stainless steel sheath is about 10-30 weight percent of the total electrode, typically about 12-28 weight percent of the total electrode, and more typically about 20-26 weight percent of the total electrode.

In still another and/or alternative aspect of the present invention, the cored electrode includes a metal sheath and fill composition that forms a metal deposition having a high manganese content. In one non-limiting embodiment of the invention, the metal deposition of the electrode of the present invention includes at least about 4 weight percent manganese, at least about 5 weight percent nickel, and at least about 12 weight percent chromium. In one particular non-limiting aspect of this embodiment, the metal deposition of the electrode of the present invention includes at least about 4.5 weight percent manganese, at least about 7 weight percent nickel, and at least about 17 weight percent chromium. In another particular non-limiting aspect of this embodiment, the metal deposition of the electrode of the present invention includes about 4.5-7.5 weight percent manganese, about 7-10 weight percent nickel, about 17-20 weight percent chromium, up to about 0.2 weight percent carbon, up to about 0.3 weight percent copper, up to about 0.3 weight percent molybdenum, up to about 0.035 weight percent phosphorus, up to about 1.2 weight percent silicon, and up to about 0.025 weigh percent sulfur. In another non-limiting embodiment of the invention, the metal deposition of the electrode of the present invention has a composition that meets the standard of ISO 17633 class 18 8 Mn.

In yet another and/or alternative aspect of the present invention, the electrode of the present invention includes a fill composition that has a slag system which enhances the weld layer(s) or buffer layer(s) formed by the electrode. The one or more slag forming agents in the fill composition also at least partially shield the formed weld bead or deposited buffer layers from the atmosphere. The fill composition typically includes one or more metal alloying agents selected to at least closely match the desired weld metal composition and/or to obtain the desired properties of the formed weld bead. The components of the fill composition can include one or more metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), one or more metal carbonates (e.g., calcium carbonate, etc.), one or more metal fluorides (e.g., barium fluoride, bismuth fluoride, calcium fluoride, potassium fluoride, sodium fluoride, Teflon, etc.), and/or one or more metal alloying agents (e.g., aluminum, antimony, bismuth, boron, calcium, carbon, chromium, cobalt, copper, iron, lead, manganese, molybdenum, nickel, niobium, silicon, sulfur, tin, titanium, tungsten, vanadium, zinc, zirconium, etc.). In one non-limiting embodiment of the invention, the slag system of the fill composition constitutes at least about 1 weight percent of the electrode, typically less than 30 weight percent of the electrode, more typically about 3-20 weight percent of the electrode, and still more typically about 7-14 weight percent of the electrode. In another non-limiting embodiment of the invention, the slag system of the fill composition has a lower weight percent than the metal alloy content of the fill composition. In one non-limiting aspect of this embodiment, the weight percent ratio of the metal alloy content to the slag system content is at least about 1.5:1, typically at least about 1.75:1, more typically about 1.9-5.5:1, and even more typically about 2-4:1. The slag system of the fill composition is used to at least partially provide protection to the weld metal or buffer layer during and/or after a deposition procedure and/or to facilitate in a particular deposition procedure. In still another non-limiting embodiment of the invention, the slag system includes at least one deposition protection agent. In one non-limiting aspect of this embodiment, at least one of the deposition protection agents include a gas generating compound that generates a shielding gas during the metal deposition operation. The gas generating compound generally decomposes during the welding operation and releases a gas that at least partially protects the weld metal or buffer layers (e.g., $CO_2$ generating compounds, fluoride generating compounds, etc.). The released gas has the effect of reducing the partial pressure of nitrogen in the arc environment so that nitrogen pickup in the deposited metal is reduced. Excessive nitrogen on the deposited metal can lead to adverse porosity in the deposited metal which can compromise the physical properties and appearance of the deposited metal. The released gas also or alternatively can scrub moisture from the arc region thereby reducing the amount of hydrogen absorption by the deposited metal. By reducing the moisture about the deposited metal, a reduced amount of hydrogen from the water is absorbed into the deposited metal thereby reducing the porosity of the deposited metal. In one particular non-limiting aspect of this embodiment, the gas generating compound includes a fluoride generating compound (e.g., $CaF_2$, $K_3AlF_6$, etc.). In one non-limiting formulation, the one or more fluoride generating compounds constitute a majority of the gas generating compounds. In one particular non-limiting aspect of this embodiment, the gas generating compound constitutes at least about 0.1 weight percent of the electrode, typically about 0.2-5 weight percent of the electrode, more typically about 0.4-2 weight percent of the electrode, and even more typically about 0.6-1.4 weight percent of the electrode. The gas generating compound also or alternatively constitute at least about 1 weight percent of the slag system, typically about 2-40 weight percent of the slag system, more typically about 4-18 weight percent of the slag system, and even more typically about 8-12 weight percent of the slag system. In yet another non-limiting embodiment of the invention, the slag system includes at least one bulk agent that is used to cover and protect the deposited metal layers from the atmosphere until the metal deposited layers has at least partially solidified. In one particular non-limiting aspect of this embodiment, the bulk agent includes a metal oxide (e.g., $TiO_2$, etc.). In one non-limiting formulation, titanium oxide constitutes a majority of the bulk agent. In one particular non-limiting aspect of this embodiment, the bulk agent constitutes at least about 1 weight percent of the electrode, typically about 1.5-8 weight percent of the electrode, more typically about 2-6 weight percent of the electrode, and even more typically about 3.5-5 weight percent of the electrode. The bulk agent also or alternatively constitutes at least about 20 weight percent of the slag system, typically about 25-90 weight percent of the slag system, more typically about 30-60 weight percent of the slag system, and even more typically about 40-55 weight percent of the slag system. In still yet another non-limiting embodiment of the invention, the slag system includes at least one slag wetting agent, arc stabilization agent, slag removal agent, and/or a surface deposition agent. The slag wetting agent, when used, facilitates in ensuring that the slag fully covers the deposited metal to protect the deposited metal from the atmosphere until the metal deposited layers has at least partially solidified, and/or to facilitate in the appearance of the deposited metal. In one particular non-limiting aspect of this embodiment, the slag wetting agent includes a metal oxide (e.g., $SiO_2$, $Al_2O_3$, etc.). In one non-limiting formulation, silicon dioxide oxide constitutes a majority of the slag wetting agent. In one particular non-limiting aspect of this embodiment, the slag wetting agent constitutes at least about 0.1 weight percent of the electrode, typically about 0.2-6 weight percent of the electrode, more typically about 0.5-5 weight percent of the electrode, and even more typically about 1-4 weight percent of the electrode. The slag wetting also or alternatively constitutes at least about 10 weight percent of the slag system, typically about 15-60 weight percent of the slag system, more typically about 20-40 weight percent of the slag system, and even more typically about 20-35 weight percent of the slag system. The stabilization agent, when used, facilitates in producing a quiet arc that minimizes spatter. In one particular non-limiting aspect of this embodiment, the stabilization agent includes a metal oxide (e.g., $K_2O$, $Na_2O$, $TiO_2$, etc.). In one non-limiting formulation, potassium and/or sodium oxide constitutes a majority of the stabilization agent. In one particular non-limiting aspect of this embodiment, the stabilization agent (excluding a bulking agent such as $TiO_2$ which has some limited degree of arc stabilization effect) constitutes at least about 0.1 weight percent of the electrode, typically about 0.2-4 weight percent of the electrode, more typically about 0.3-3.5 weight percent of the electrode, and even more typically about 0.5-2 weight percent of the electrode. The stabilization agent (excluding a bulking agent such as $TiO_2$ which has some limited degree of arc stabilization effect) also or alternatively constitutes at least about 1.5 weight percent of the slag system, typically about 2-40 weight percent of the slag system, more typically about 5-20 weight percent of the slag system, and even more typically about 7-15 weight percent of the slag system. The surface deposition agent, when used, contributes to the shine and overall surface appearance of the deposited metal. In one particular non-limiting aspect of this embodiment, the surface deposition agent includes a metal oxide (e.g., $Al_2O_3$, $Na_2O$, $K_2O$, etc.). In one non-limiting formulation, aluminum oxide constitutes a majority of the surface deposition agent. In one particular non-limiting aspect of this embodiment, the surface deposition constitutes at least about 0.1 weight percent of the electrode, typically about 0.2-4 weight percent of the electrode, more typically about 0.3-3.25 weight percent of the electrode, and even more typically about 0.4-1.8 weight percent of the electrode. The surface deposition agent also or alternatively constitutes at least about 1.6 weight percent of the slag system, typically about 2-35 weight percent of the slag system, more typically about 6-22 weight percent of the slag system, and even more typically about 8-16 weight percent of the slag system. The slag removal agent, when used, contributes to the easy removal of the slag on and/or around the deposited metal. In one particular non-limiting aspect of this embodiment, the surface deposition agent includes a metal oxide (e.g., $Na_2O$, $K_2O$, etc.). The slag system can also include agents that increase and/or decrease the viscosity of the slag, and/or reduce fume production.

It is a primary object of the invention to provide a metal deposition and process for forming such a metal deposition that improves the welding together of dissimilar metal, high manganese metals and/or improves the hardfacing or hard surfacing of low carbon steel and/or low alloy steels.

Another and/or alternative object of the present invention is the provision metal deposition and process for forming such a metal deposition that meets the standard of ISO 17633 class 18 8 Mn.

Still another and/or alternative object of the present invention is the provision of a metal deposition and process for forming such a metal deposition that utilizes a flux cored electrode that forms a metal deposition that meets the standard of ISO 17633 class 18 8 Mn.

Yet another and/or alternative object of the present invention is the provision of a metal deposition and process for forming such a metal deposition that utilizes a flux cored electrode having a slag system that facilitates in the formation of a metal deposition that meets the standard of ISO 17633 class 18 8 Mn.

Still yet another and/or alternative object of the present invention is the provision of a metal deposition and process for forming such a metal deposition that utilizes a flux cored electrode having a slag system that is a self shielding system.

These and other objects and advantages will become apparent from the discussion of the invention.

DETAILED DESCRIPTION OF THE INVENTION

The present invention is directed to an improved flux cored electrode that is specifically formulated to weld together dissimilar metals or to form buffer layers on carbon steels and low alloy steels. The flux cored electrode includes a novel slag system that enables the flux cored electrode to be used with or without a shielding gas. If a shielding gas is used, the shielding gas is typically carbon dioxide or a carbon dioxide-argon blend that includes about 18-25% carbon dioxide.

The flux cored electrode is formulated to deposit a crack resistant, high manganese, stainless steel composition that is particularly useful for dissimilar metal joining and for depositing buffer layers on carbon steels and low alloy steels.

The flux cored electrode typically has a low carbon mild steel sheath or a stainless steel sheath. When a low carbon mild steel sheath is used, the sheath typically comprises about 40-60 weight percent of the flux cored electrode, and more typically about 55 weight percent of the flux cored electrode. When a stainless steel sheath such as 304L is used, the sheath typically comprises about 65-80 weight percent of the flux cored electrode, and more typically about 75 weight percent of the flux cored electrode.

The deposited metal from the flux cored electrode typically has a composition that meets the ISO 17633 standard under the 18 8 Mn classification. Generally the deposited metal has the following general weight percent composition:

| | |
|---|---|
| Carbon | 0.2 max. |
| Chromium | 17–20 |
| Copper | 0.3 max. |
| Manganese | 4.5–7.5 |
| Molybdenum | 0.3 max. |
| Nickel | 7–10 |
| Phosphorous | 0.035 max. |
| Silicon | 1.2 max. |
| Sulfur | 0.025 max. |

The flux cored electrode includes a filling composition that enhances the deposition of the metal onto a workpiece and facilitates in obtaining the desired deposited metal composition. The filling composition typically includes, by weight percent of the electrode, about 5-15 weight percent slag system and the balance alloying agents. In one specific embodiment, the filling composition constitutes about 20-50 weight percent by electrode and includes, by weight percent of the electrode, about 8-12 weight percent slag system and the balance alloying agents. One general composition of the slag system includes, by weight percent electrode:

| | |
|---|---|
| Bulk Agent | 1–10% |
| Gas generating compound | 0.05–6% |
| Slag wetting agent | 0.05–7% |
| Stabilization agent | 0–5% |
| Surface deposition agent | 0–5% |

In another general composition of the slag system includes, by weight percent electrode:

| | |
|---|---|
| Bulk Agent | 2–9% |
| Gas generating compound | 0.1–5% |
| Slag wetting agent | 0.1–6% |
| Stabilization agent | 0.1–4% |
| Surface deposition agent | 0–4% |

In still another general composition of the slag system includes, by weight percent electrode:

| | |
|---|---|
| Titanium oxide | 2–6% |
| Fluoride generating compound | 0.4–2% |
| Silicon dioxide | 0.2–5% |
| Potassium/Sodium Compound | 0.2–4% |
| Aluminum oxide | 0–4% |

In one specific non-limiting composition of the slag system includes, by weight percent electrode:

| | |
|---|---|
| Titanium oxide | 4.3% |
| $CaF_2$ plus $K_3AlF_6$ | 1% |
| Silicon dioxide | 2% |
| Potassium and Sodium Oxide | 0.83% |
| Aluminum oxide | 0.95 |

The functions of the components of the specific slag system set forth above, are set forth below; however, it will be appreciated that the discussed functions are the believed functions, not the actual or complete functions of such components.

The titanium oxide in the slag system primarily provides bulk to the slag so that the slag can cover the deposited metal. The titanium oxide also facilitates in arc stabilization. As can be appreciated, other or additional bulking agents can be used.

The fluoride compounds provide the gas generating characteristics of the slag system. The fluoride compounds (e.g., $CaF_2$, $K_3AlF_6$, etc.) typically at least partially vaporize in the electric arc during welding, thereby forming a gas barrier about the region of deposited metal from the electrode. As can be appreciated, other or additional gas generating compounds can be used. This gas barrier reduces the partial pressure of the nitrogen in the environment about the molten deposited metal, thereby reducing the amount of nitrogen pickup by the deposited metal. The reduced amount of nitrogen in the deposited metal reduces the amount of porosity in the deposited metal, thereby enhancing the physical properties and appearance of the deposited metal. The gas barrier also facilitates in scrubbing the moisture from the arc region, thereby reducing the amount of hydrogen adsorption by the deposited metal. Excessive amounts of hydrogen in the deposited metal can cause porosity problems in the deposited metal. Moisture about the arc region is a source of hydrogen.

The silicon dioxide is a slag wetting agent. The silicon dioxide facilitates in causing the slag to cover the deposited metal on a workpiece so as to improve the appearance of the deposited metal. As can be appreciated, other or additional slag wetting agents can be used. The amount of silicon dioxide in the slag system should be limited so as to avoid tenacious slag, pieces of which virtually explode during the cooling of the slag and deposited metal. Typically the silicon dioxide content of the slag system is no more than about 7 weight percent of the electrode, and typically no more than about 4 weight percent of the electrode.

The aluminum oxide also assists in slag wetting. The aluminum oxide primarily functions as a surface deposition agent that improves the glassy characteristics of the underside of the slag cover on the deposited metal, thereby improving the shine and overall surface appearance of the deposited metal. As can be appreciated, other or additional surface deposition agents can be used (e.g., $Na_2O$, $K_2O$, etc.). The amount of aluminum oxide in the slag system, like the silicon dioxide content, should be limited so as to avoid tenacious slag. Typically, the aluminum oxide content of the slag system is no more than about 5 weight percent of the electrode, and typically no more than about 3 weight percent of the electrode.

The sodium and potassium compounds provide arc stabilization during the depositing of metal on a workpiece. Sodium oxide and potassium oxide are the typical compounds used in the slag system. As can be appreciated, other or additional sodium and/or potassium compounds can be used (e.g., $K_2AlF_6$, etc.). As can also be appreciated, other or additional arc stabilization agents can be used (e.g., $TiO_2$, etc.). The arc stabilization agent facilitates in producing a soft quiet arc that generates little spatter during the deposition process. When sodium oxide is included in the slag system, the sodium oxide also facilitates in promoting slag glassiness and slag removal when the slag and deposited weld metal have cooled. The sodium oxide also facilitates in reducing the tenacity of the slag, thus stabilizing the slag as it cools. The amount of sodium oxide in the slag system should be limited to avoid excessive moisture pickup by the slag that can lead to the increased porosity of the deposited metal. Typically the sodium oxide content of the slag system is no more than about 4 weight percent of the electrode, and more typically no more than about 2 weight percent of the electrode. The potassium oxide, like the sodium oxide, also facilitates in promoting slag glassiness and slag removal when the slag and deposited weld metal have cooled. The amount of potassium oxide in the slag system, like the sodium oxide content, should be limited to avoid excessive moisture pickup by the slag that can lead to the increased porosity of the deposited metal. Typically the potassium oxide content of the slag system is no more than about 2 weight percent of the electrode, and more typically no more than about 1 weight percent of the electrode. Typically when sodium and potassium oxide are included in the slag system, the sodium oxide content is greater than the potassium oxide content. In one non-limiting embodiment, the weight ratio of the sodium oxide to potassium oxide in the slag system is about 1.5-10:1, and typically about 4-6:1; however, other ratios can exist.

The alloying agents in the filling composition will vary depending on the composition of the metal sheath. The alloying agents in a filling composition used in a mild steel sheath typically includes chromium, manganese and nickel. The alloying agents may also include copper, molybdenum, and silicon. In one non-limiting composition, the alloying agents in a filling composition for use in a low carbon mild steel sheath include, by weight percent electrode, about 16-22 weight percent chromium, up to about 0.6 weight percent copper, about 3-9 weight percent manganese, up to about 0.5 weight percent molybdenum, about 6-12 weight percent nickel, about 0.1-1.8 weight percent silicon, and about 10-35 weight percent iron. In one non-limiting composition, the alloying agents in a filling composition for use in a 304 L stainless steel sheath include, by weight percent electrode, up to 5 weight percent chromium, up to about 0.6 weight percent copper, about 1-7 weight percent manganese, up to about 0.5 weight percent molybdenum, up to about 3 weight percent nickel, up to about 0.8 weight percent silicon, and about 2-23 weight percent iron.

As set forth above, the principle applications of the flux cored electrode is the joining of dissimilar metals and the formation of buffer layers on carbon steel and low alloy steels prior to hardfacing. Typical dissimilar metal joints include, but are not limited to, welding abrasion resisting low alloy steel wear plates to ordinary mild steel structural members, and welding 14% Mn manganese steel pieces to ordinary mild steel or to other pieces of 14% manganese steel. The weld metal formed by the flux cored electrode resists cracking of the weld metal in these types of applications. A non-limiting example of a buffer layer formed by the flux cored electrode is the application of a buffer layer on high carbon steel (e.g., 1045 steel, 1080 steel, etc.) before cladding the steel with a highly abrasion resistant chromium carbide. The buffer layer resists cracking in the HAZ of the high carbon steel during welding since the austenitic matrix of the deposited metal composition resists hydrogen from diffusing into the HAZ. After the application of the chromium carbide cladding, the cladding tends to crack (which is desirable), however, the cracking of the cladding can result in the cracking of the high carbon steel (which is undesirable). The buffer layer resists or prevents the cracks in the cladding from propagating into the high carbon steel. The composition of the buffer layer further provides better bonding between the cladding and the high carbon steel since the buffer layer does not harden.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

I claim:

1. A cored electrode to form a high manganese metal deposition that includes at least about 4 weight percent manganese by weight of the metal deposition and at least about 10 weight percent chromium by weight of the metal deposition, said cored electrode comprising a metal sheath and filling composition, said filling composition including metal alloying agents and a slag system and having a weight percentage ratio of said metal alloying agents to said slag system in said filling composition is at least about 1.5:1, said slag system including about 0.1-4 weight percent of the cored electrode potassium oxide, sodium oxide or mixtures thereof, about 0.2-4 weight percent of the cored electrode aluminum oxide, about 0.1-3 weight percent of the cored electrode fluoride generating compound, about 0.2-6 weight percent of the cored electrode silicon dioxide, and about 1-8 weight percent of the cored electrode titanium dioxide.

2. The cored electrode as defined in claim 1, wherein the content of said gas generating compound is sufficient to fully shield said metal deposition during a deposition process.

3. The cored electrode as defined in claim 1, wherein said metal sheath is low carbon steel metal or a stainless steel.

4. The cored electrode as defined in claim wherein said metal sheath is low carbon steel metal or a stainless steel.

5. The cored electrode as defined in claim 1, wherein said filling composition constitutes about 10-50 weight percent of the cored electrode.

6. The cored electrode as defined in claim 3, wherein said filling composition constitutes about 10-50 weight percent of the cored electrode.

7. The cored electrode as defined in claim 4, wherein said filling composition constitutes about 10-50 weight percent of the cored electrode.

8. The cored electrode as defined in claim 1, wherein said slag system constitutes about 3-20 weight percent of the cored electrode.

9. The cored electrode as defined in claim 6, wherein said slag system constitutes about 3-20 weight percent of the cored electrode.

10. The cored electrode as defined in claim 7, wherein said slag system constitutes about 3-20 weight percent of the cored electrode.

11. The cored electrode as defined in claim 1, wherein a weight percentage ratio of said metal alloying agents to said slag system in said filling composition is about 1.9-5.5:1.

12. The cored electrode as defined in claim 9, wherein a weight percentage ratio of said metal alloying agents to said slag system in said filling composition is about 1.9-5.5:1.

13. The cored electrode as defined in claim 10, wherein a weight percentage ratio of said metal alloying agents to said slag system in said filling composition is about 1.9-5.5:1.

14. The cored electrode as defined in claim 1, wherein said bulk agent includes a majority weight percent of titanium dioxide.

15. The cored electrode as defined in claim 13, wherein said bulk agent includes a majority weight percent of titanium dioxide.

16. The cored electrode as defined in claim 1, wherein said gas generating agent includes a majority weight percent of fluoride generating compound.

17. The cored electrode as defined in claim 15, wherein said gas generating agent includes a majority weight percent of fluoride generating compound.

18. The cored electrode as defined in claim 1, wherein said slag wetting compound includes a majority weight percent of silicon dioxide.

19. The cored electrode as defined in claim 17, wherein said slag wetting compound includes a of majority weight percent silicon dioxide.

20. The cored electrode as defined in claim 1, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

21. The cored electrode as defined in claim 19, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

22. The cored electrode as defined in claim 12, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

23. A method of forming a metal deposition that includes at least about 4 weight percent manganese by weight of the metal deposition and at least about 10 weight percent chromium by weight of the metal deposition:
   a) providing a cored electrode that includes a metal sheath and filling composition, said filling composition including metal alloying agents and a slag system, said slag system including about 0.1-4 weight percent of the cored electrode potassium oxide, sodium oxide or mixtures thereof, about 0.2-4 weight percent of the cored electrode aluminum oxide, about 0.1-3 weight percent of the cored electrode fluoride generating compound, about 0.2-6 weight percent of the cored electrode silicon dioxide, and about 1-8 weight percent of the cored electrode titanium dioxide; and,
   b) at least partially melting said cored electrode by an electric current to cause said gas generating compound to release a shielding gas and cause a melted portion of said cored electrode to deposit molten metal on a workpiece, said molten metal including at least about 4 weight percent manganese by weight of the metal deposition and at least about 10 weight percent chromium by weight of the metal deposition.

24. The method as defined in claim 23, including the step of directing a shielding gas to said workpiece to at least partially shield said melted portion of said cored electrode being deposited on the workpiece.

25. The method as defined in claim 24, wherein said shielding gas includes argon, carbon dioxide or mixtures thereof.

26. The method as defined in claim 23, wherein the content of said gas generating compound is sufficient to fully shield said melted portion of said cored electrode being deposited on the workpiece.

27. The method as defined in claim 25, wherein the content of said gas generating compound is sufficient to fully shield said melted portion of said cored electrode being deposited on the workpiece.

28. The method as defined in claim 23, wherein said metal sheath is low carbon steel metal or a stainless steel.

29. The method as defined in claim 27, wherein said metal sheath is low carbon steel metal or a stainless steel.

30. The method as defined in claim 23, wherein said filling composition constitutes about 10-50 weight percent of the cored electrode.

31. The method as defined in claim 27, wherein said tilling composition constitutes about 10-50 weight percent of the cored electrode.

32. The method as defined in claim 29, wherein said filling composition constitutes about 10-50 weight percent of the cored electrode.

33. The method as defined in claim 23, wherein said slag system constitutes about 3-20 weight percent of the cored electrode.

34. The method as defined in claim 31, wherein said slag system constitutes about 3-20 weight percent of the cored electrode.

35. The method as defined in claim 32, wherein said slag system constitutes about 3-20 weight percent of the cored electrode.

36. The method as defined in claim 23, wherein a weight percentage ratio of said metal alloying agents to said slag system in said filling composition is about 1.9-5.5:1.

37. The method as defined in claim 34, wherein a weight percentage ratio of said metal alloying agents to said slag system in said filling composition is about 1.9-5.5:1.

38. The method as defined in claim 35, wherein a weight percentage ratio of said metal alloying agents to said slag system in said tilling composition is about 1.9-5.5:1.

39. The method as defined in claim 23, wherein said bulk agent includes a majority weight percent of titanium dioxide.

40. The method as defined in claim 38, wherein said bulk agent includes a majority weight percent of titanium dioxide.

41. The method as defined in claim 23, wherein said gas generating agent includes a majority weight percent of fluoride generating compound.

42. The method as defined in claim 40, wherein said gas generating agent includes a majority weight percent of fluoride generating compound.

43. The method as defined in claim 23, wherein said slag wetting compound includes a majority weight percent of silicon dioxide.

44. The method as defined in claim 42, wherein said slag wetting compound includes a majority weight percent of silicon dioxide.

45. The method as defined in claim 23, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

46. The method as defined in claim 44, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

47. The method as defined in claim 37, wherein said slag system includes about 0.2-4 weight percent of the cored electrode potassium oxide, sodium oxide or mixtures thereof, about 0.3-3.25 weight percent of the cored electrode aluminum oxide, about 0.4-2 weight percent of the cored electrode fluoride generating compound, about 0.2-5 weight percent of the cored electrode silicon dioxide, and about 2-6 weight percent of the cored electrode titanium dioxide.

48. The method as defined in claim 23, wherein said metal deposition includes about 4.5-7.5 weight percent manganese, about 7-10 weight percent nickel, about 17-20 weight percent chromium, up to about 0.2 weight percent carbon, up to about 0.3 weight percent copper, up to about 0.3 weight percent molybdenum, up to about 0.035 weight percent phosphorus, up to about 1.2 weight percent silicon, and up to about 0.025 weight percent sulfur.

49. The method as defined in claim 23, wherein said slag system includes by weight percent electrode:

| | |
|---|---|
| Titanium oxide | 2-6% |
| Fluoride generating compound that includes CaF$_2$ and K$_3$AlF$_6$ | 0.4-2% |
| Silicon dioxide | 0.2-5% |
| Potassium and Sodium Compound | 0.2-4% |
| Aluminum oxide | 0.3-3.25%. |

50. The method as defined in claim 23, wherein said slag system includes about 2-6 weight percent of the cored electrode titanium dioxide, about 0.4-2 weight percent of the cored electrode fluoride generating compound, about 0.2-5 weight percent of the cored electrodesilicon dioxide, about 0.2-4 weight percent of the cored electrode potassium oxide, sodium oxide or mixtures thereof, and about 0.3-3.25 weight percent of the cored electrode aluminum oxide.

51. The method as defined in claim 23, wherein said electrode forms a weld metal having a hardness of about 150-300 HB and cold-set by mechanical strain of about 275-400 HB (Brinell Hardness).

52. The method as defined in claim 23, wherein said electrode forms a weld metal that includes at least about 4 weight percent manganese by weight of the metal deposition, at least about 5 weight percent nickel by weight of the metal deposition, and at least about 12 weight percent chromium by weight of the metal deposition.

53. The method as defined in claim 23, wherein said electrode forms a weld metal that includes at least about 4.5 weight percent manganese by weight of the metal deposition, at least about 7 weight percent nickel by weight of the metal deposition, and at least about 17 weight percent chromium by weight of the metal deposition.

54. The cored electrode as defined in claim 1, wherein a weight ratio of said sodium oxide to said potassium oxide is about 1.5-10:1.

55. The cored electrode as defined in claim 21, wherein a weight ratio of said sodium oxide to said potassium oxide is about 1.5-10:1.

56. The cored electrode as defined in claim 22, wherein a weight ratio of said sodium oxide to said potassium oxide is about 1.5-10:1.

57. The cored electrode as defined in claim 1, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

58. The cored electrode as defined in claim 55, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

59. The cored electrode as defined in claim 56, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

60. The method as defined in claim 23, wherein a weight ratio of said sodium oxide to said potassium oxide is about 1.5-10:1.

61. The method as defined in claim 52, wherein a weight ratio of said sodium oxide to said potassium oxide is about 1.5-10:1.

62. The method as defined in claim 53, wherein a weight ratio of said sodium oxide to said potassium oxide is about 1.5-10:1.

63. The method as defined in claim 23, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

64. The method as defined in claim 61, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

65. The method as defined in claim 62, wherein said alloy agents include 1-7 weight percent of the cored electrode manganese, 2-35 weight percent of the cored electrode iron, up to about 9 weight percent of the cored electrode nickel, up to about 22 weight percent of the cored electrode chromium, up to about 1.8 weight percent of the cored electrode silicon, up to about 0.5 weigh percent of the cored electrode molybdenum, and up to about 0.6 weigher percent of the cored electrode copper.

* * * * *

UNITED STATES PATENT AND TRADEMARK OFFICE
CERTIFICATE OF CORRECTION

PATENT NO. : 8,168,922 B2
APPLICATION NO. : 10/967391
DATED : May 1, 2012
INVENTOR(S) : Damian J. Kotecki It is certified that error appears in the above-identified patent and that said Letters Patent is hereby corrected as shown below:

Column 10, line 36, claim 4, insert --2,-- between "claim" and "wherein".

Column 12, line 18, claim 31, delete "tilling" and insert --filling--.

Column 12, line 41, claim 38, delete "tilling" and insert --filling--.

Column 13, line 38, claim 50, delete "electrodesilicon" and insert --electrode silicon--.

Signed and Sealed this
Third Day of July, 2012

David J. Kappos
*Director of the United States Patent and Trademark Office*